United States Patent
Dhamija et al.

(10) Patent No.: US 12,165,393 B1
(45) Date of Patent: Dec. 10, 2024

(54) LANE DEPARTURE MONITORING

(71) Applicant: Samsara Inc., San Francisco, CA (US)

(72) Inventors: Akshay Raj Dhamija, Campbell, CA (US); Abner Ayala, Orlando, FL (US); Rohit Annigeri, Santa Clara, CA (US); Cole Jurden, Kansas City, MO (US); Douglas Boyle, Verdi, NV (US); Jason Liu, Christiansburg, VA (US); Kevin Lai, Redmond, WA (US); Jose Cazarin, Calgary (CA); Pang Wu, San Francisco, CA (US); Nathan Hurst, Seattle, WA (US); Brian Westphal, Livermore, CA (US); Lucas Doyle, San Francisco, CA (US); Saurabh Tripathi, San Jose, CA (US); Shirish Nair, Shoreline, WA (US)

(73) Assignee: Samsara Inc., San Francisco, CA (US)

(*) Notice: Subject to any disclaimer, the term of this patent is extended or adjusted under 35 U.S.C. 154(b) by 0 days.

(21) Appl. No.: 18/643,164

(22) Filed: Apr. 23, 2024

(51) Int. Cl.
| | |
|---|---|
| *G06V 10/776* | (2022.01) |
| *G06V 10/764* | (2022.01) |
| *G06V 10/774* | (2022.01) |
| *G06V 20/56* | (2022.01) |
| *G06V 20/59* | (2022.01) |
| *G08G 1/16* | (2006.01) |

(52) U.S. Cl.
CPC ......... *G06V 10/776* (2022.01); *G06V 10/764* (2022.01); *G06V 10/774* (2022.01); *G06V 20/588* (2022.01); *G06V 20/597* (2022.01); *G08G 1/167* (2013.01)

(58) Field of Classification Search
None
See application file for complete search history.

(56) References Cited

U.S. PATENT DOCUMENTS

| | | | |
|---|---|---|---|
| 11,615,141 B1* | 3/2023 | Hoye | G06V 20/41 707/769 |
| 2022/0013014 A1* | 1/2022 | Xu | G01C 21/3691 |
| 2023/0419688 A1* | 12/2023 | Saggu | G06N 3/084 |
| 2024/0177498 A1* | 5/2024 | Pittner | G01C 21/3822 |

OTHER PUBLICATIONS

"Unprecedented Visibility More Platform Power Everything You Need to Know From the Vision 24 Motive Innovation Summit", [Online]. Retrieved from the Internet: https: gomotive.com blog vision-24-product-announcements , (Apr. 10, 2024), 13 pgs.

* cited by examiner

*Primary Examiner* — Leon Flores
(74) *Attorney, Agent, or Firm* — Schwegman Lundberg & Woessner. P.A.

(57) ABSTRACT

Methods, systems, and computer programs are presented for the management of lane-departure (LD) events. One method includes training a classifier for LD events and loading the classifier into a vehicle. LD events are detected based on outward images using the classifier, while the turn signal is monitored to prevent false triggers. If an LD event is detected, rules are checked for alerting the driver and deciding whether to alert the driver or not. Subsequently, additional rules are checked for reporting the event and deciding whether to report the event to a Behavior Monitoring System (BMS) or to discard it. The method also includes a solid line departure model that identifies crossing dashed, solid-white, and solid-yellow lanes, delaying alerts and event generation until a significant portion of the vehicle crosses over the lane. The model also outputs a confidence score reflecting the amount of vehicle deviation from the driving lane.

20 Claims, 12 Drawing Sheets

○ LANE DEPARTURE WARNING

ENABLES AI DETECTION OF UNSAFE LANE DEPARTURES WITHOUT TURN SIGNALS, SURFACES EVENTS IN SAFETY INBOX, AND ENABLES CONFIGURABLE ALERTS

IN-CAB AUDIO ALERTS: [ OFF ▷ ]   SPEED THRESHOLD: [ 35 MPH ▷ ]   DETECTION SENSITIVITY: [ HIGH ▷ ]

◯─ NUDGES

NUDGES ARE IN-CAB ALERTS THAT PROVIDE DRIVERS WITH AN OPPORTUNITY TO SELF-CORRECT BEFORE THEIR SAFETY SCORES ARE IMPACTED. DRIVERS WILL RECEIVE NUDGES EVERY TIME A SAFETY BEHAVIOR IS DETECTED BUT IT IS NOT ESCALATED TO A COACHABLE EVENT UNTIL THE DRIVER EXCEEDS THE THRESHOLD. THIS REDUCES THE NUMBER OF EVENTS SENT TO THE SAFETY INBOX.

[ 2 ▷ ] NUDGES IN 12 HOURS

SEND EVENTS TO COACHING AND EVENT INBOX AFTER A DRIVER GETS

AFTER THE DRIFER HITS THE ABOVE THRESHOLD, ALL EVENTS BEFORE AND AFTER WILL APPEAR IN COACHING AND THE INBOX. THRESHOLD WILL BE RESET EVERY 12 HOURS. EVENTS WILL NOT APPEAR IN REPORTIN OR IMPACT SCORE BEFORE THEY HIT THRESHOLD.

UNSAFE LANE DEPARTURE DETECTION SAFETY INBOX

THIS FEATURE ENABLES OR DISABLES AUDIO ALERTS FOR UNSAFE LANE DEPARTURE.

[ DISABLED ▷ ]

FIG. 5

Devices

| Image | Health Status | Vehicle name | Uptime last 50 hr | Last Location | Camera last ct. | Last ct. | Recommended action |
|---|---|---|---|---|---|---|---|
| | Camera misaligned | 36-19 Joe Doe | | Site 1<br>33 min ago | Mar 19, 2024<br>8:26 AM | Mar 19, 2024<br>8:26 AM | Misaligned camera detected |
| | Lane Departure | 36-978 | | I39/Rt15 interchange<br>ten seconds ago | Mar 19, 2024<br>5:22 AM | Mar 19, 2024<br>5:22 AM | Initiate coaching session |
| | Lane Departure | 36-19 Jane Art | | Jim Arthur sop<br>seconds ago | Mar 19, 2024<br>6:22 AM | Mar 19, 2024<br>6:22 AM | No action |
| | Lane Departure | 36-2512 | | Jim Arthur sop<br>5 min ago | Mar 1, 2024<br>5:50 AM | Mar 1, 2024<br>5:50 AM | Initiate coaching session |

FIG. 8

LANE DEPARTURE MONITORING

TECHNICAL FIELD

The subject matter disclosed herein generally relates to methods, systems, and machine-readable storage media for vehicle safety technologies, including methods, systems, and machine-readable storage media for monitoring driving behaviors and improving road safety.

BACKGROUND

Lane Departure accidents usually occur while driving on the highway and thus at high speeds. At such high speeds, a vehicle that even gently brushes against a side wall or another car can careen uncontrollably, flip over, or sustain serious impact.

Fleet managers without advanced safety features built into their vehicles do not have the means to alert drivers in real-time when they drift from a lane. Moreover, even if those advanced safety features are present, safety managers lack visibility into their occurrence in the field.

Moreover, the potential influx of lane departure alerts could be excessive, considering lane changes are a regular part of driving, which could lead to an inundation of notifications for fleet managers.

BRIEF DESCRIPTION OF THE DRAWINGS

Various appended drawings illustrate examples of the present disclosure and cannot be considered limiting its scope.

FIG. 5 shows a UI for configuring parameters for lane departure (LD) monitoring, according to some examples.

FIG. 8 is a user interface (UI) for reviewing LD events, according to some examples.

DETAILED DESCRIPTION

Figure 1:
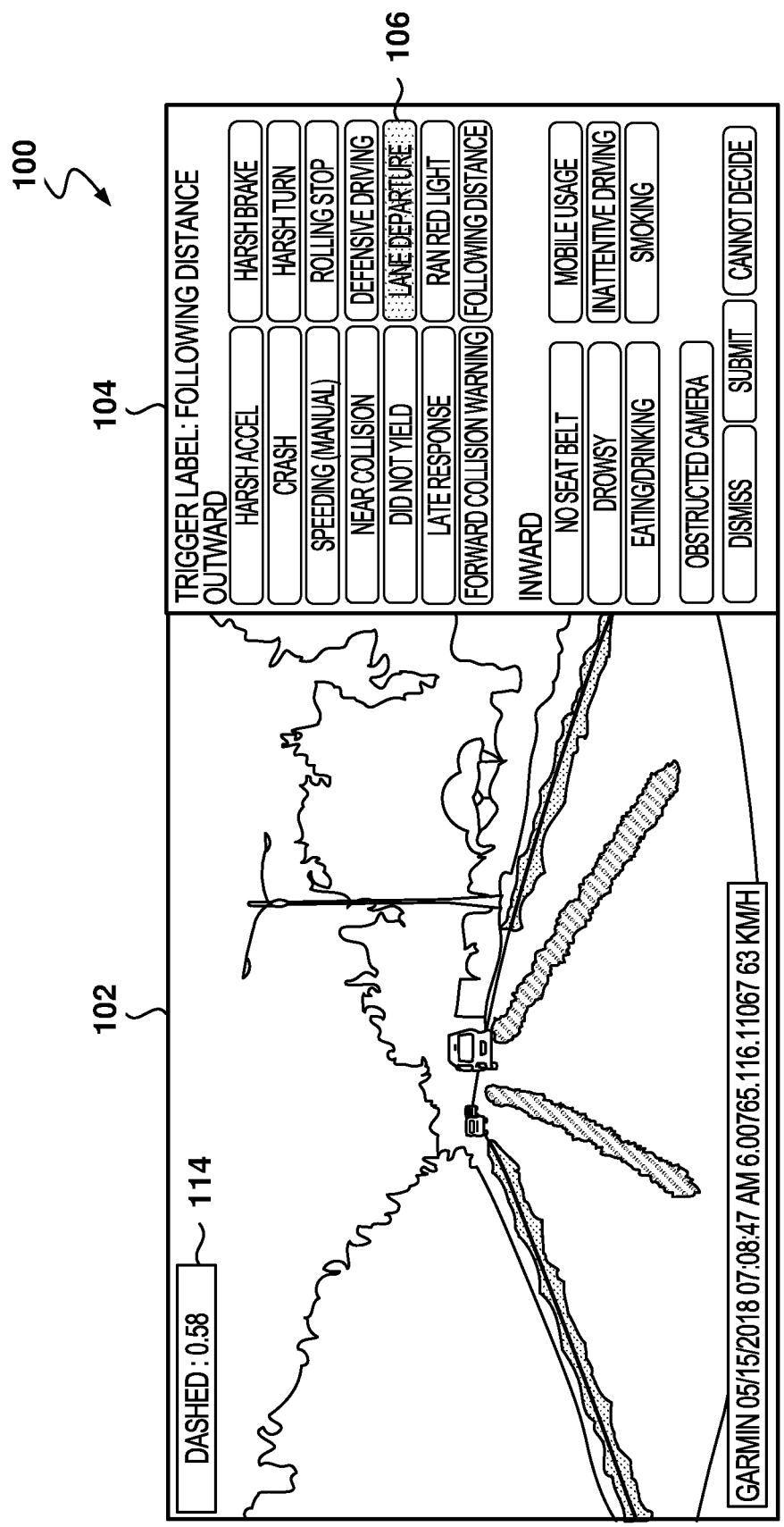
FIG. 1 illustrates a user interface (UI) for reviewing behavior events, according to some examples.

Example methods, systems, and computer programs are directed to the management of lane-departure events. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

If a vehicle is consistently veering out of its lane or drifting unintentionally, it could be an indication of careless driving, inattention, or driver fatigue. To address this issue, front-facing camera footage is used to identify such behavior and notify drivers and safety managers, enabling them to intervene and provide coaching to the driver. This approach helps to ensure safety on the road and prevent accidents.

The present disclosure relates to lane departure (LD) event detection. The technology includes training a classifier for LD events, which is subsequently loaded into one or more onboard systems of a vehicle, that may include a suite of sensor devices and cameras, including a front-facing camera. As the vehicle navigates roads and highways, the front-facing camera and sensors continuously capture data that include images of the road ahead, including lane markings and surrounding traffic. The classifier processes these outward images in real-time, applying its trained algorithms to detect any movements across lane markings that could indicate a lane departure. The technology accounts for the status of the turn signal, where an active turn signal prevents the triggering of the LD event. Upon detection, the technology checks one or more rules to determine if an alert will be issued to the driver.

Further, the technology evaluates additional rules for reporting the event to a Behavior Monitoring System (BMS). The BMS is an advanced analytical platform that aggregates and analyzes data related to driving behavior, providing insights into driver performance and potential safety risks. The additional rules that are evaluated for reporting LD events to the BMS are designed to filter events based on specific criteria, ensuring that only relevant and significant incidents are logged for further analysis. These criteria may include, but are not limited to, the duration and frequency of the LD event, the time of day, weather conditions, traffic patterns, and the driver's historical behavior data. For instance, a brief, momentary lane departure may not be reported if it falls below a certain time threshold, whereas repeated or prolonged departures are more likely to be reported. After checking the additional rules, the event is sent to the BMS or is discarded.

The technology also includes the development of a solid line departure model that differentiates between solid and dashed lane lines. This model delays alerts and event generation until a significant portion of the vehicle has traversed the lane line. It recognizes vehicle crossings over dashed lines but may not generate events in such instances.

The model outputs values indicating the vehicle's position relative to lane lines, such as in-lane, dashed, yellow, or white, along with a confidence score. This confidence score serves as an indicator of the vehicle's deviation from the driving lane, with a higher score signifying a greater deviation.

Glossary of Terms

Some of the concepts used for the description of the solution are presented below.

Unsafe Lane Departure refers to a situation where a vehicle unintentionally exits one lane and enters another lane that is valid (known as "Unintended Lane Departure") or when the vehicle moves out of the drivable area, often crossing a solid line and entering oncoming traffic or going off the road (known as "Drivable Area Departure").

A rule is a predefined set of instructions used to analyze one or more events and perform a task in response to the one or more events. The instructions include one or more conditional checks based on the event data to decide which action or actions to perform.

FIG. 1 is a user interface (UI 100) for annotating lane-departure (LD) events, according to some examples. FIG. 1 illustrates an exemplary user interface of a Safety Event Review Portal for monitoring and reviewing vehicle safety events. The interface is divided into three sections: a video playback area 102 and a trigger label panel 104. In some examples, an event timeline may be included, e.g., below the video playback area 102.

According to certain examples, the UI 100 interface is presented as a split-screen display. For example, as seen in the UI 100, the left portion shows the video playback area 102, captured with a forward-facing dash camera, and the right portion displays the trigger label panel 104.

The video playback area 102 displays a forward view of a road with lane markings highlighted by augmented reality overlays. The overlays indicate the lanes on the road, including edge lines and in-road lines separating the lanes. The reviewer may use the overlays to easily identify if the vehicle maintains its position within the lane.

The display also includes timestamp and speed information, which may be used for logging purposes or driver feedback. Further, an LD classification field 114 provides an estimate of the position of the vehicle within the lane (e.g., the vehicle is within the lane, crossing a continuous line) and a confidence score for the estimate.

In the illustrated example, the LD classification field 114 shows that the vehicle crosses a dashed line with a confidence score of 0.58, where a confidence score is a real number between zero and one. The confidence score is a numerical representation of the probability that the LD event occurred. The confidence score indicates the probability that the estimated category is the correct category, where the higher the confidence score, the more probable it is that the estimate is correct. In this case, the confidence score of 0.58 is relatively low because the vehicle has just barely crossed the dashed line. It is expected that as the vehicle continues to move further into the adjacent lane, the confidence score will correspondingly rise, indicating an increased confidence in the LD event classification.

The trigger label panel 104 is organized into three sections, each with interactive elements for categorizing the nature of the safety event. The first section includes outward-facing events such as harsh acceleration, crash, and lane departure 106. The second section lists inward-facing events that may involve the driver, including, but not limited to: no seat belt usage, drowsiness, and mobile usage.

The third section contains interface elements that may include action buttons for categorizing the event. The action buttons include a dismiss button 108, a submit button 110, and a cannot-decide button 112. The dismiss button 108 is for dismissing the event because the review showed that the respective event did not really happen (e.g., the driver was not following too closely. This dismissal is referred to herein as a false positive. The submit button 110 is to confirm that the event happened, referred to herein as a true positive.

Upon the dismissal of an event, the system is configured to exclude the dismissed event from the end-user's view, which saves time for the end user so the end user does not have to waste time inspecting false positives. Conversely, if the event is not dismissed after being evaluated against the system's criteria, it is then classified as a true positive and subsequently reported to the end-user. This reporting process ensures that the end-user is informed of all relevant and accurate LD events, allowing for appropriate attention and potential corrective action.

According to certain examples, the system may discern between intentional and unintentional lane departures to avoid false alerts. For example, an intentional lane departure may be determined by the activation of the vehicle's turn signals. When the system detects that the turn signals are engaged, it interprets this as the driver's deliberate action to change lanes or make a turn. n such cases, the system recognizes that this is not a true Lane Departure (LD) event and, therefore, does not trigger an LD alert or report.

Further, in some examples, the system may incorporate speed thresholds to refine its reporting criteria. Accordingly, lane departures at lower speeds (e.g., less than 65 km/h) may be ignored and not considered for reporting.

In some examples, LD events are based on images from the outward camera, but other signals may be used. For example, inward images may be used to determine that the driver is looking at the side mirror to make a lane change; in this case, the lane change is considered intentional, and an LD event will not be triggered.

In some examples, the system will not consider going over dashed lanes an LD event, and the system will trigger LD events when the vehicle crosses a solid line on either side of the road. In other examples, crossing over dashed lanes might also be included when considering LD events. Typically, the solid lines are white or yellow, depending on the norm for the local geography.

In some examples, a machine-learning (ML) model is used to identify LD events based on images captured by the vehicle's forward-facing camera. However, the accuracy of the ML model may be improved to reduce the number of false positives and increase the number of false negatives to ensure that all the LD events are flagged for review.

To improve the accuracy of the ML model and reduce the number of false positives, reviewer information is collected to get better estimates of the LD events and capture this information to improve the training set for the ML model.

Unsafe Lane Position, encompassing both lane wandering and unintended lane departure, may result from drowsy, distracted, or otherwise unsafe driving practices. The implementation of accurate in-cab alerts has the potential to significantly reduce accidents by providing timely warnings to drivers upon the detection of unsafe behavior. This proactive approach not only aims to decrease the incidence of injuries but also serves to mitigate the financial and temporal costs associated with accident follow-ups and insurance claims.

Figure 2:
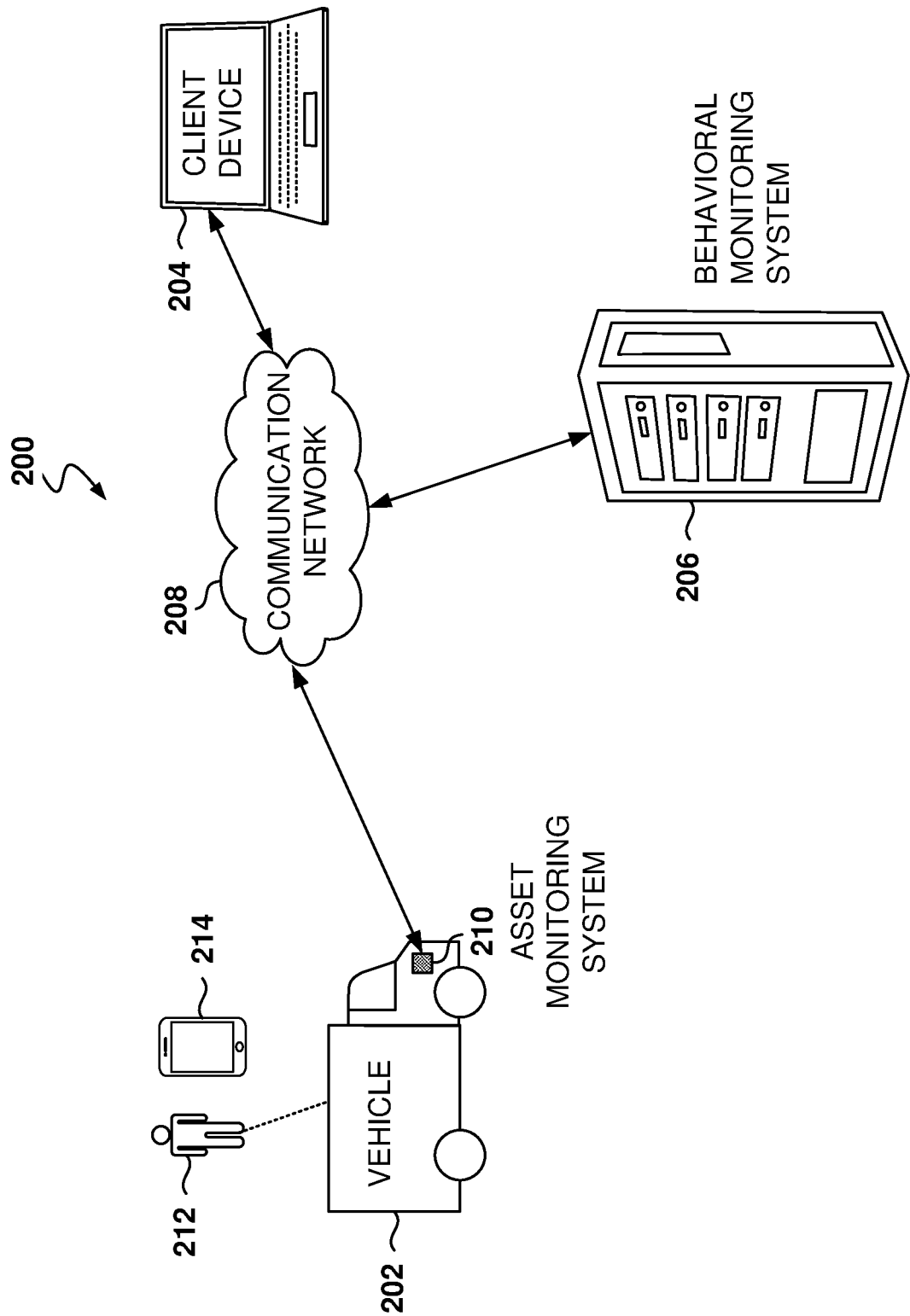
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The asset monitoring system 210 may include one or more hardware devices to perform monitoring functions at the vehicle. In some examples, the AMS 210 includes a communications device that is a hardware device that acts as a network access point for the AMS 210. For example, the communications device can be established as an edge device of a network or system of nodes within the vehicle 202.

The AMS may include a variety of sensors, computing devices (e.g., electronic control units (ECUs), actuators, etc., deployed within the vehicle. According to certain example, the AMS may encompass a variety of sensors, including speed sensors for monitoring vehicle velocity, accelerometers and gyroscopes for detecting changes in motion and orientation, and cameras for visual data acquisition to support functions like lane departure detection. It may also employ radar and LIDAR sensors for distance measurements (i.e., for adaptive cruise control), temperature sensors for monitoring engine and cabin conditions, pressure sensors for system diagnostics such as tire and hydraulic pressures, and fuel level sensors for managing refueling schedules and efficiency calculations. The communications device in the AMS facilitates wireless communication capabilities by connecting to wireless networks (e.g., cellular, wireless local area network, satellite communication networks, etc.) for communicating with remote computing devices. The communications device may also provide additional functionality, such as firewall functionality to filter inbound and outbound communications, disallow incoming communications from suspicious or unauthorized sources, etc.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if spoken, indicate the use of offensive, derogatory, and otherwise undesirable language. As another example, a triggering condition may define unsafe lane-departure events.

Each triggering condition may also be associated with a corresponding set of response actions to be performed by the behavioral monitoring system 206 if the triggering condition has been satisfied. For example, the response actions may include notifying the driver of a dangerous condition (e.g., drowsy driving, lane departure), transmitting alerts to specified users/user devices, generating incident reports based on corresponding triggering conditions, modifying the mode of operation of sensors or the vehicle, and the like.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior. For example, the user interface enables the administrator to define a modified mode of operation of the sensors in the vehicle 202 to be initiated to capture additional data for inclusion in the incident report. This may include increasing the number of sensors used to capture data, such as by initiating the use of video cameras or microphones, increasing the performance of the sensors that are in use, such as by increasing the resolution used to capture video, and modifying the positioning of the sensors, such as by changing the angle or view of a camera to capture the detected action better.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
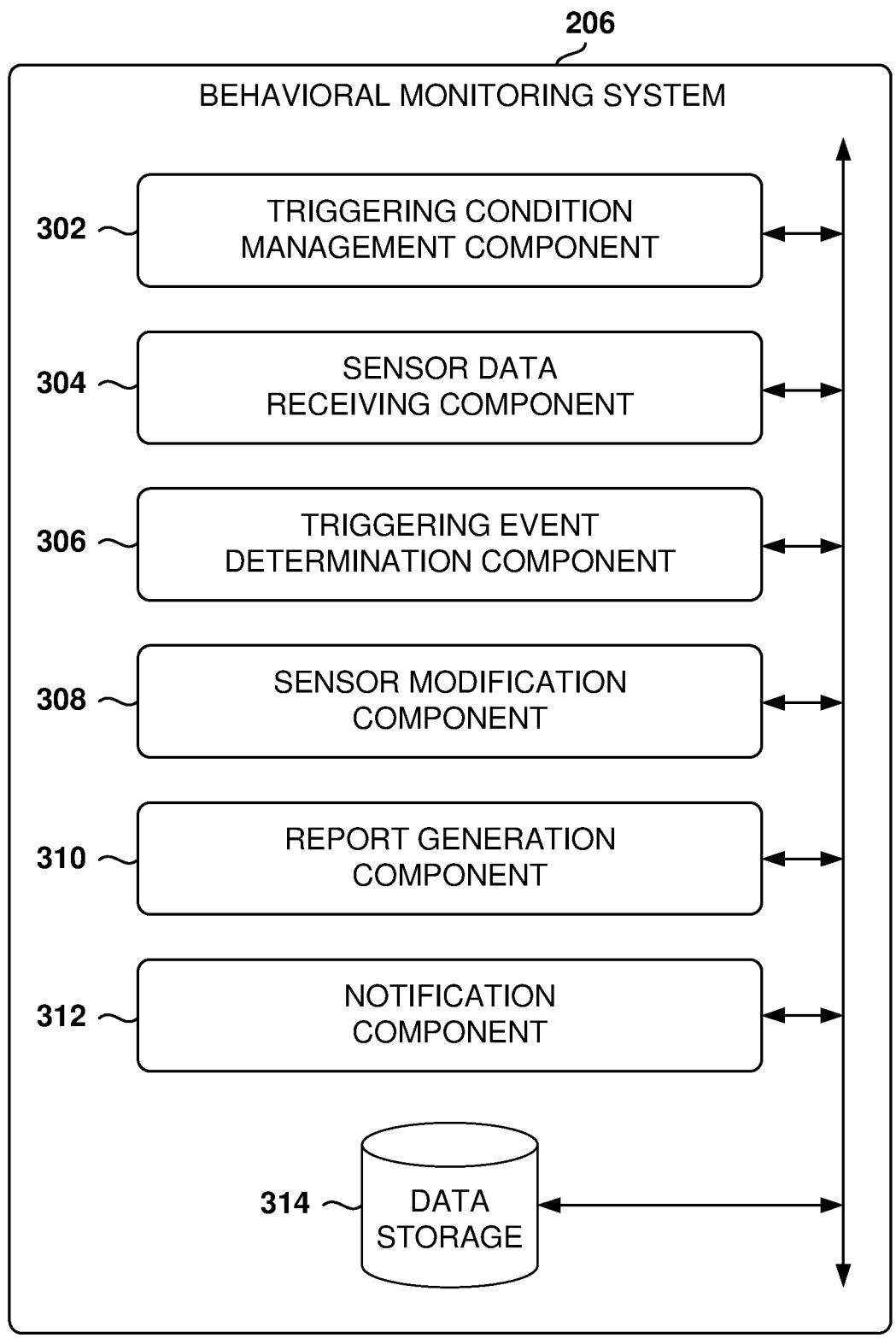
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, a driver of the vehicle, the time of the incident, the action that satisfied the triggering condition (e.g., lane departure, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
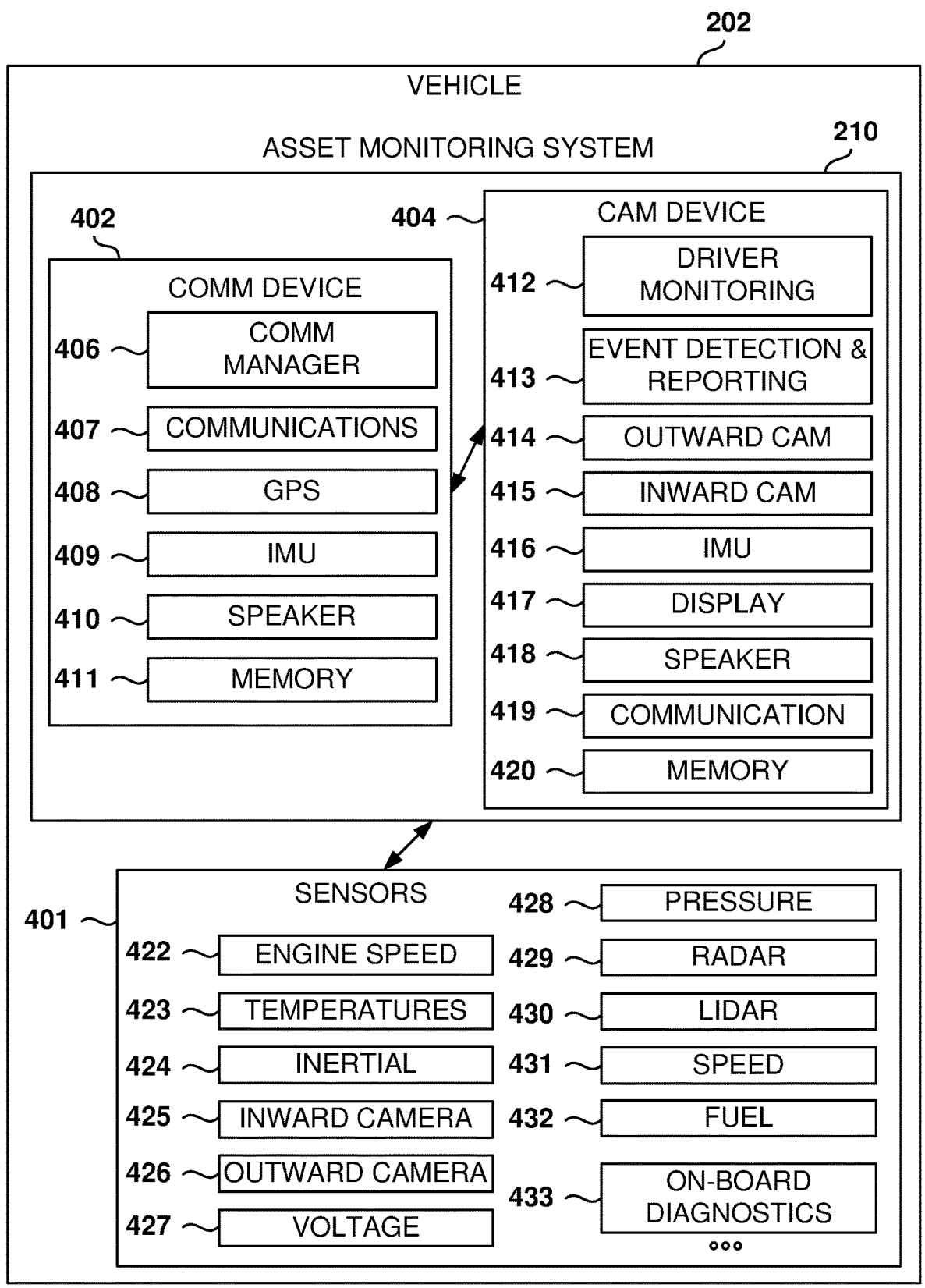
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as LD detection, driving while drowsy, following too close, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described below, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

FIG. 5 shows a UI 502 for configuring LD-related parameters, according to some examples. The UI 502 is designed to enable artificial intelligence detection of unsafe lane departures that occur without the use of turn signals and to record such events in a safety inbox. The interface also allows for the configuration of alerts to notify the driver of such events.

Below the lane-departure warning title, a descriptive text explains that the system enables AI detection of unsafe lane departures, surfaces events in a safety inbox, and allows for configurable alerts.

The UI 502 includes several interactive elements for adjusting the settings of the lane departure warning system. The lane departure warning section includes options for in-cab audio alerts 506, speed threshold 508, and detection sensitivity 510. When enabled, the lane-departure warning detection allows the monitoring of events associated with the vehicle departing the lane of travel.

The in-cab audio alerts 506 can be toggled on or off, allowing the fleet manager to choose whether to provide auditory notifications to the driver. The speed threshold 508 enables setting a speed threshold, which is a value that determines the minimum vehicle speed at which the lane departure alerts will be activated. Controlling the minimum speed threshold allows the fleet manager to control the number of events reported, e.g., discarding events when drivers make harsh turns across lanes at 30 mph.

Additionally, the detection sensitivity 510 option is for adjusting the detection sensitivity of the system, which can be set to various levels, such as high, medium, or low, to modify the responsiveness of the detection mechanism.

The UI 502 also features a section labeled nudges 504, which describes in-cab alerts that provide drivers with the opportunity to self-correct before their safety scores are impacted. These nudges are issued every time a safety behavior is detected but are not escalated to a coachable event until the driver exceeds a predefined threshold. This functionality is designed to reduce the number of events sent to the safety inbox of the fleet manager.

The nudges functionality serves as an alternative mechanism for managers to regulate the influx of events into their inboxes. Upon activation of the nudge feature, should a solitary event be detected within a predetermined timeframe, the system is designed to refrain from dispatching an event notification to the inbox. Instead, an alert may be issued solely to the driver, with no subsequent procedures initiated. However, in instances where the behavior is observed to recur within a range of two to four times-a parameter that is subject to configuration—the system will then proceed to issue notifications to both the inbox and the driver. This feature empowers customers with the discretion to determine whether a behavior, if not repeated within a specified timeframe, necessitates notification. This process assists in self-coaching, which gives some control to the drivers over the reporting of event notifications.

In some examples, the nudge feature is configurable to activate between a configurable number of times within a twelve-hour timeframe via drop-down menu 512. In some examples, the configurable number is between two and four times per 12 hours, but other ranges may be utilized. This functionality is designed to monitor attentiveness on the road. Specifically, if there are two instances of inattentiveness within twelve hours, the system will record and communicate two events to the supervisor. Should there be only one instance of distraction within the same duration, no events will be communicated to the supervisor. Nonetheless, an aggregate report may be generated to ensure that there is awareness of any such behavior, allowing for a collective overview of occurrences. This feature ensures that supervisors are informed about significant events while also providing a broader perspective on driver behavior through aggregated data.

Lastly, the interface includes a control for turning on or off 514 the unsafe lane departure detection safety inbox feature. This control allows the fleet manager to turn on or off event reporting of unsafe lane departure events, providing flexibility in how the system notifies the fleet manager of detected events.

Overall, the UI 502 offers managers a customizable experience in monitoring and responding to lane departure events. It aims to enhance road safety through advanced detection and alerting features.

Figure 6:
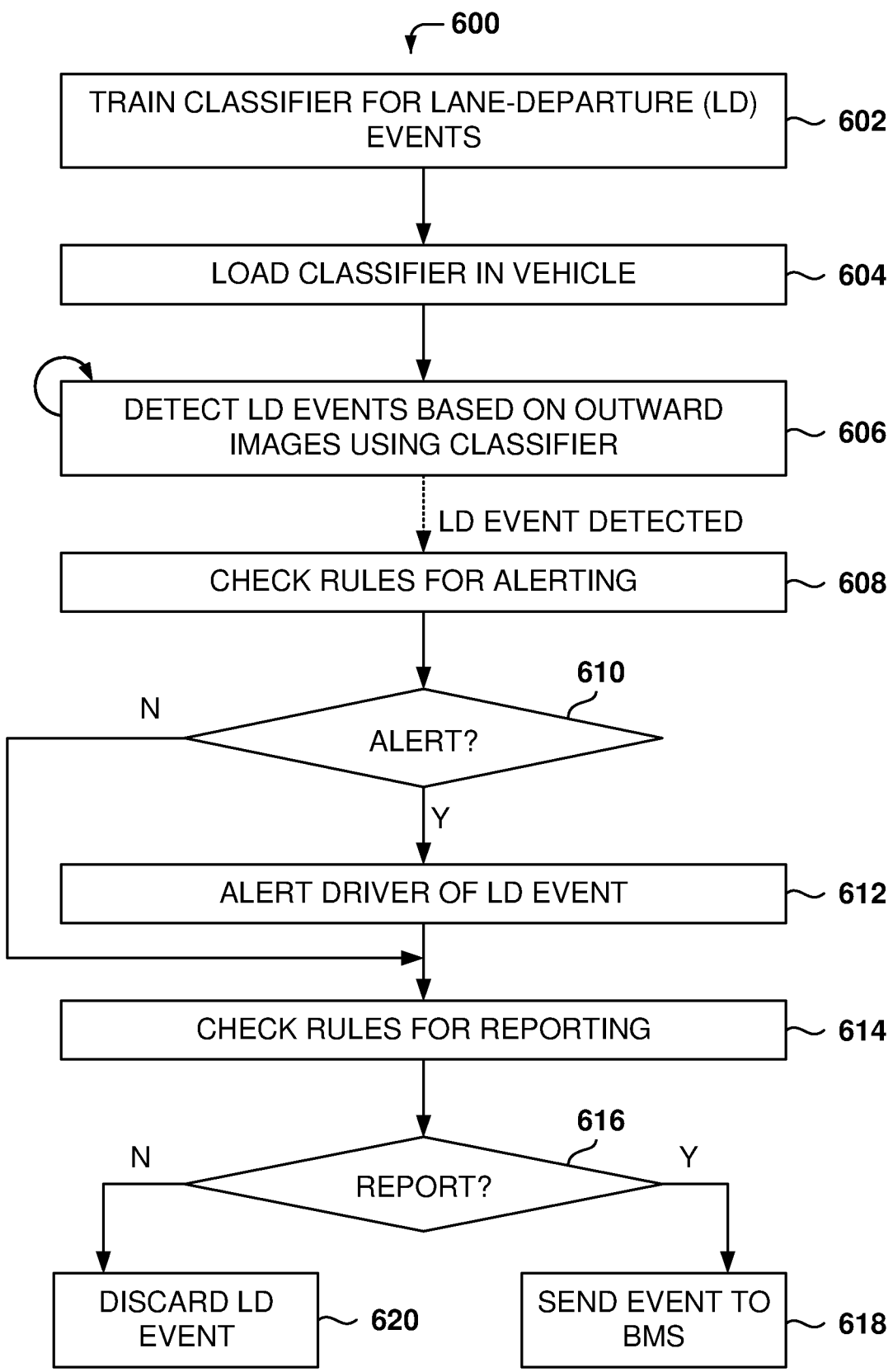
FIG. 6 is a flowchart of a method for LD event detection, according to some examples.

FIG. 6 is a flowchart of a method 600 for LD event detection, according to some examples. While the various operations in this flowchart are presented and described sequentially, one of ordinary skill will appreciate that some or all of the operations may be executed in a different order, be combined or omitted, or be executed in parallel.

Operation 602 is for training a classifier for lane-departure events. Following the training, the classifier is loaded into one or more onboard systems of a vehicle at operation 604.

Once the classifier is loaded, the method 600 proceeds to operation 606, where LD events are detected using the classifier, based on sensor data including outward images. In some examples, data indicative of an activation of the turn signal is monitored, so if the turn signal is active, then the LD event will not be triggered. If an LD event is detected, the method continues to operation 608 to check rules for alerting.

At operation 610, a decision is made whether to alert the driver. If the decision is 'Yes' (Y), the method moves to operation 612 to alert the driver of the LD event. If the decision is 'No' (N), or after alerting the driver, the method advances to operation 614 to check rules for reporting.

At operation 616, another decision is made regarding whether to report the event. If the decision is 'Yes' (Y), the method proceeds to operation 618 to send the event to the Behavior Monitoring System (BMS). If the decision is 'No' (N), the method moves to operation 620 to discard the LD event.

In the development of the solid line departure model, a method is presented that continuously seeks to identify solid white or yellow lanes alongside distinguishing dashed lines. This model estimates the position of the vehicle and, upon detection of the vehicle traversing a line, is programmed to delay issuing an alert and generating an inbox event until approximately 30% or 40% of the vehicle has crossed over the lane. The model possesses the capability to recognize instances when the vehicle crosses over a dashed lane; however, in some examples, the model does not generate events when crossing dashed lines.

In some examples, the model outputs a value from the group comprising in-lane (when the vehicle is properly in the lane), dashed (when the vehicle is crossing a dashed line), yellow (when the vehicle is crossing a yellow line), and white (when the vehicle is crossing a white lane), and the confidence score associated with the selected value.

In some examples, the confidence score is used as a measurement indicating how far the vehicle has crossed the line. The higher the confidence score, the further the vehicle has wandered away from the driving lane. In the example illustrated in FIG. 1, the classification value is "dashed," and the confidence score is 0.58, which indicates that the vehicle just started to cross over a dashed line.

Figure 7:
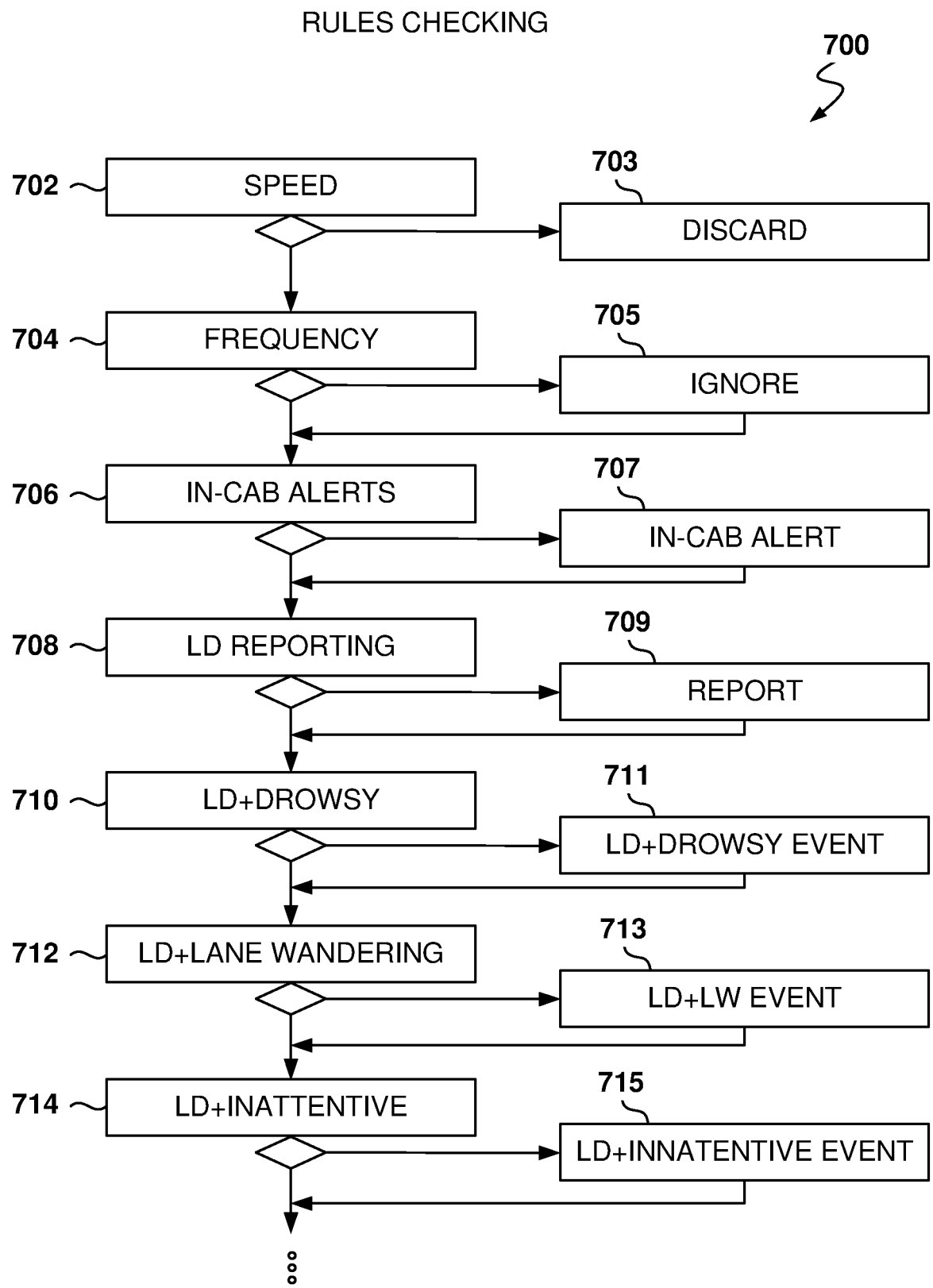
FIG. 7 illustrates the process of rule checking for LD monitoring, according to some examples.

FIG. 7 illustrates the method 700 of rule checking for LD monitoring, according to some examples. The method 700 shows how to utilize rules that analyze an event and determine an action (e.g., in-cab alert, discard event, send to BMS for review).

As used herein, a rule is a predefined set of instructions used to analyze one or more events and perform a task in response to the one or more events. The instructions include one or more conditional checks based on the event data to decide which action or actions to perform. A possible response action is to do nothing and discard the event. Other possible actions include generating an in-cab alert, generating a report, etc. Some rules are triggered in response to one or more events, while other rules may be triggered periodically to check for certain conditions.

At operation 702, the speed is checked. If the speed is below a predetermined threshold, the method 700 moves to operation 703, where the event is discarded. If the speed criterion is met, the method 700 continues to operation 704, where the frequency of the event is evaluated; that is, the number of previous LD events over a predetermined period is calculated (e.g., 4 LD events over 24 hours), and if this number is below a configurable threshold, then the LD event is recorded, but no further action is performed at operation 705.

At operation 706, the rule for checking in-cab alerts is used to determine whether an in-cab alert should be performed. If the in-cab alert is warranted, method 700 transitions to operation 707, where the in-cab alert is generated.

At operation 708, the rule regarding LD reporting is evaluated to determine whether the LD event will be reported based on configurable criteria (see, for example, the configurable items described in FIG. 5). If reporting is required, the method 700 advances to operation 709, where the report is created.

Subsequent to the LD reporting, the method 700 continues to operation 710, where it is determined if there is an LD+drowsy condition, which means that the LD event has occurred while a drowsy-driving event has taken place within a predetermined time period (e.g., one minute, five minutes). That is, this rule is checking for a combination of events that may be dangerous for the driver. If the driver is departing the lane but has also shown signs of drowsiness, this means that the risk is much higher than just departing the lane when the driver is driving attentively.

If LD+drowsy is detected, then the method 700 moves to operation 711, and the LD+drowsy event is recorded. If the LD+drowsy condition is not detected, the method 700 proceeds to operation 712.

At operation 712, the combination of events LD and lane wandering is checked. Lane wandering refers to the vehicle staying in the lane but swerving from side to side in an erratic manner. If LD and lane wandering are detected to occur within a predetermined period, the method 700 advances to operation 713, where the LD+lane wandering event is reported.

At operation 714, the rule to check for a combination of LD and inattentive behavior is assessed. Inattentive behavior occurs when the driver is not paying full attention while driving, such as by checking a mobile phone or reading a map or document. If inattentive behavior is detected with LD within a predetermined period, the method 700 moves to operation 715, where the LD+inattentive event is reported. The method 700 may then proceed to check for additional rules or end the process of rule checking.

Although some rules are shown as examples of a single or a combination of events, other rules may also include checking more than two events over a period of time, such as checking, LD, drowsy driving, and lane wandering. Thus, the embodiments illustrated in FIG. 7 should therefore not be interpreted to be exclusive or limiting but rather illustrative.

Further, the rules described with reference to FIG. 7 may be executed in a different order. Also, the rules may be executed on the BMS server or at the ASM within the vehicle. In some cases, some rules are executed at the BMS server, and other rules are executed at the ASM. However, some rules may also be executed both in the BMS server and the ASM.

FIG. 8 is a user interface (UI) 802 for reviewing camera-impairment events, according to some examples. The UI 802 is organized into a table format with several columns presenting different types of information for each event.

The first column, labeled image, displays a small image 804 associated with the event detected. If the client selects (e.g., clicks) one of the images 804, another UI will provide a larger scale of the image or a video associated with the image.

Adjacent to the image is the "Health Status" column, which indicates the event, such as the camera being misaligned or a lane-departure event. The "Vehicle name" column provides identifiers for the vehicles associated with the cameras (e.g., 36-978), while the "Uptime last 50 hours" column shows a graphical representation of the device's operational time over the last 50 hours.

The "Last Location" column details the device's most recent known location, with specific site names or coordinates. The next two columns, "Camera last connection" and "Last connection," present timestamps for the camera's most recent connection (e.g., Cam device 404 in FIG. 4) and the system's last contact.

Finally, the "Recommended Action" column suggests the next operation to be taken based on the device's health status, such as "Misaligned camera detected" or "Initiate coaching session," to guide the driver in improving safety.

The user interface is designed to provide a comprehensive at-a-glance overview of the status and performance of a fleet of vehicles, enabling quick identification of issues and facilitating prompt maintenance or corrective actions.

The reported events allow the manager to review them. For example, by selecting an LD event, another UI will be presented with the ability to review a ten-second video centered around its occurrence. Also, the UI may present the estimated amount of lane departure (e.g., from zero when the vehicle is in the lane to 100% when the vehicle completely leaves the driving lane).

Figure 9:
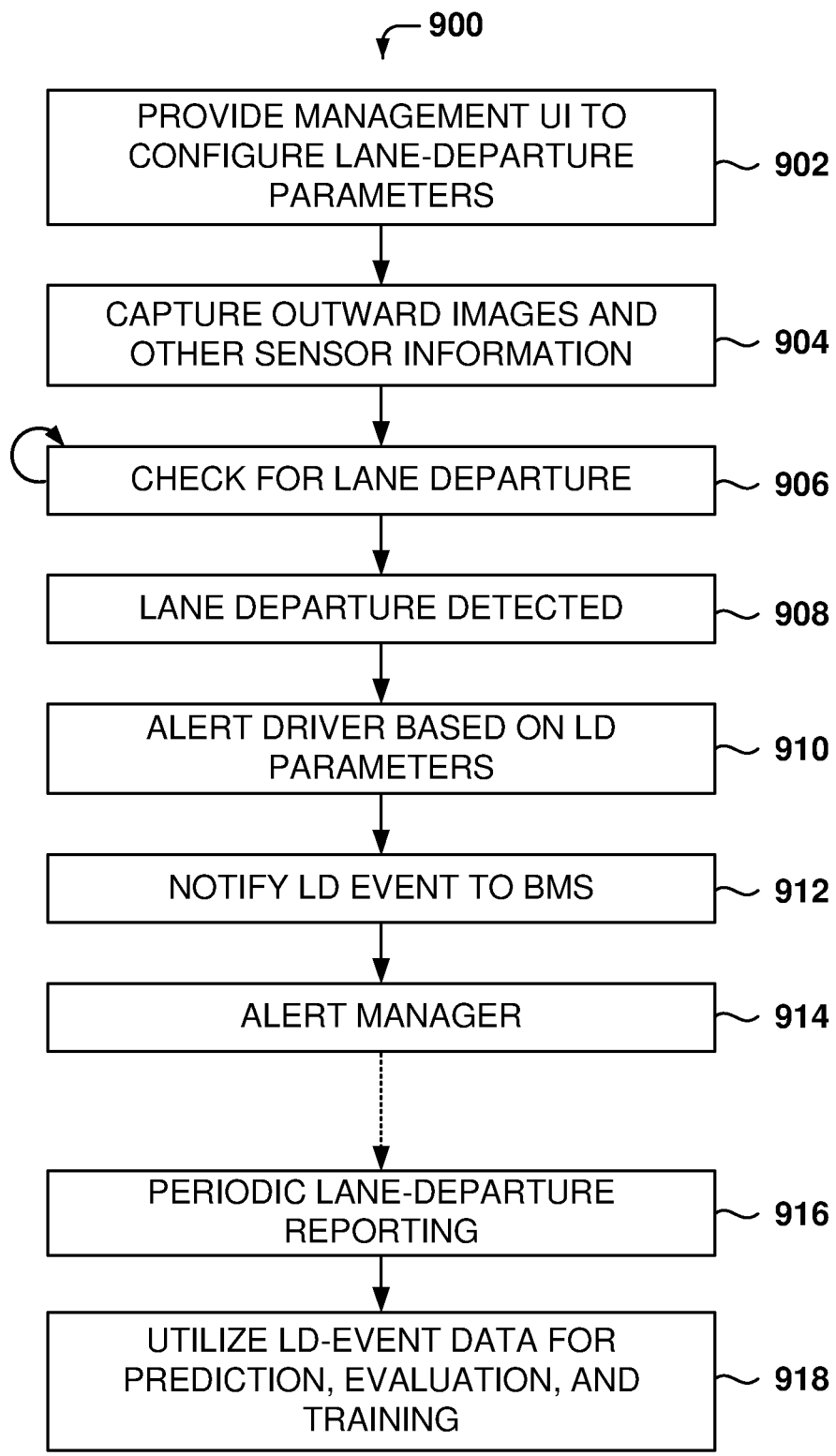
FIG. 9 is a flowchart of a method for LD management, according to some examples.

FIG. 9 is a flowchart of a method 900 for LD management, according to some examples. While the various operations in this flowchart are presented and described sequentially, one of ordinary skill will appreciate that some or all of the operations may be executed in a different order, be combined or omitted, or be executed in parallel.

At operation 902, a management user interface (UI) is provided to configure lane-departure parameters. Following this, operation 904 involves capturing outward images and other sensor information (e.g., vehicle speed). In other examples, inward images may also be captured to analyze the driver behavior around the time when the LD event took place (e.g., driver looking at the side mirror before going into a turn lane, driver inattentive).

Next, at operation 906, the system checks for a lane departure. If a lane departure is detected, the method 900 proceeds to operation 908, where the lane departure is confirmed. Once confirmed, operation 910 involves alerting the driver based on the configured LD parameters.

Subsequently, operation 912 includes notifying the BMS of the LD event. After the BMS is notified, operation 914 involves alerting the manager about the LD event.

Operation 916 may be performed in response to the LD event or periodically (e.g., every hour, every day). Operation 916 includes periodic lane-departure reporting to generate LD reports for the fleet manager. For example, a report may include the number of LD events per 1000 miles driven or per 250 hours of driving. The report may also include graphics showing the occurrence of the LD events on a chart with a time axis. The report may also include the occurrence of other events, such as drowsiness driving, to facilitate the easy identification of clusters of unsafe behavior (e.g., when the driver has been driving for more than 5 hours).

Further, at operation 918, LD-event data is utilized for prediction, evaluation, and training purposes.

Fleet managers can view LD events in their inboxes and coach drivers on these events. Further, managers may manually apply unsafe-lane-departure and lane-wandering labels to events when not automatically detected.

Figure 10:
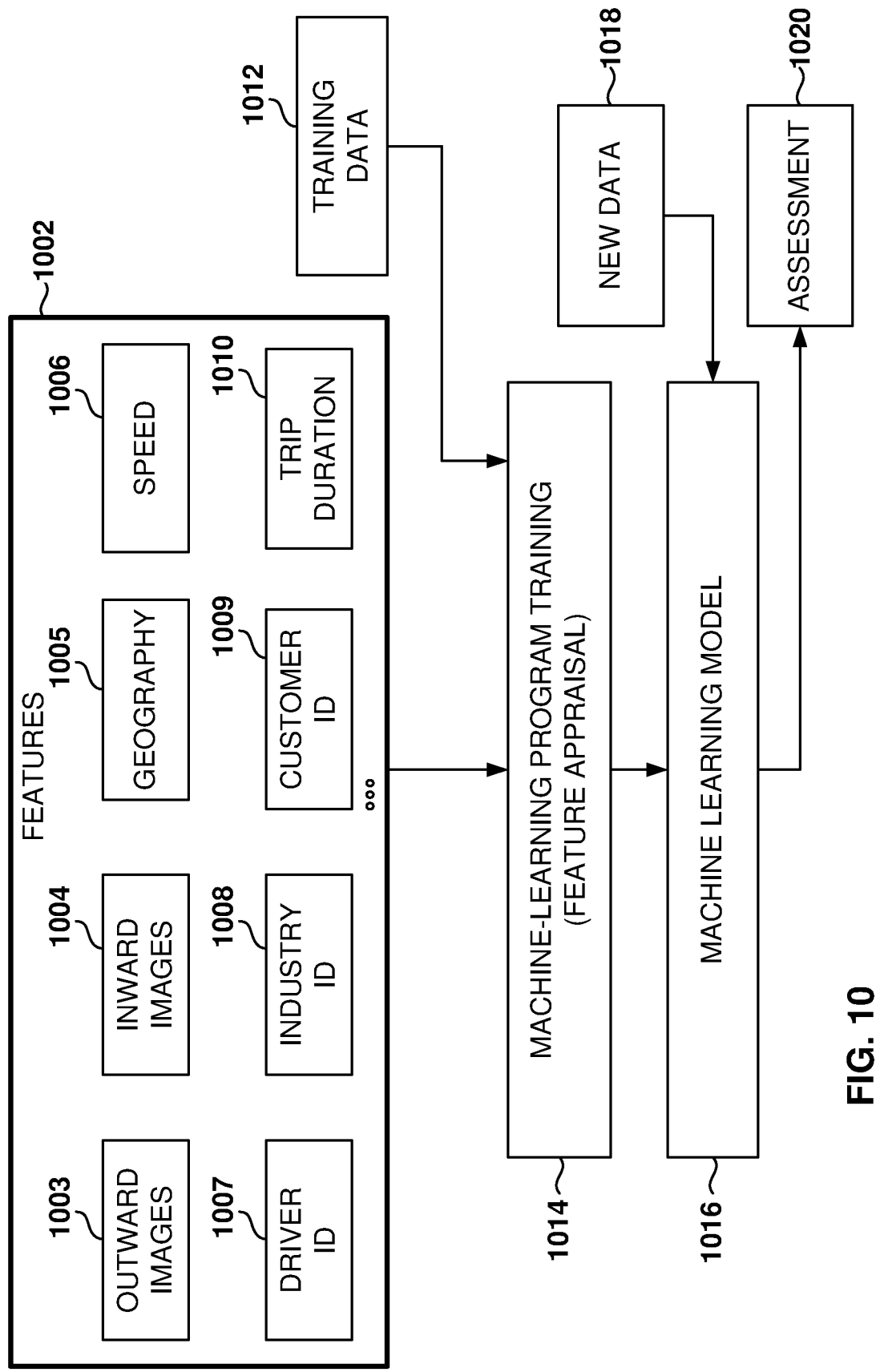
FIG. 10 illustrates the training and use of a machine-learning model, according to some example examples.

FIG. 10 illustrates the training and use of a machine-learning model 1016, according to some example examples. In some examples, machine learning (ML) models 1016 are utilized to perform operations associated with detecting LD events.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1016 from training data 1012 in order to make data-driven predictions or decisions expressed as outputs or assessments 1020. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

In some examples, the images captured by the outward camera are embedded into vectors. A plurality of images are used to estimate the occurrence of LD events. The images are sampled from the video by choosing a number of frames each second for the analysis for a predetermined number of seconds. In some examples, two frames are used per second for the last ten seconds, but other sampling frequencies and time windows may be used. Thus, twenty images are embedded and used as input to detect LD events. Estimating LD events is calculated periodically, such as twice a second, but other calculating frequencies may also be used.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders. In some examples, ML model 1016 outputs a value in the drowsiness scale index for a time window (e.g., last ten seconds).

The training data 1012 comprises examples of values for the features 1002. In some examples, the training data comprises labeled data with examples of values for the features 1002 and labels indicating the outcome, such as drowsiness detected. The machine-learning algorithms utilize the training data 1012 to find correlations among identified features 1002 that affect the outcome.

A feature 1002 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

The more accurate the training data is, the more accurate the ML model 1016 will be. Further, according to some examples, a large number of images is used for the training, such as the images from 15,000 videos.

In one example, the features 1002 may be of different types and may include one or more of outward images 1003 from outward videos, inward images 1004 of the cabin, geography 1005, speed 1006, driver identifier 1007 (ID), industry ID 1008, customer ID 1009, trip duration 1010, etc.

The speed 1006 may be used to avoid detecting LD when the speed is below a predetermined threshold. Further, the industry ID provides valuable information, as different industries tend to have different requirements associated with types of vehicles, duration of trips, number of stops, etc. Some examples of types of industry include transportation & warehousing, wholesale trade, field services, passenger transit, construction, consumer products, retail trade, food & beverage, manufacturing, health care & social assistance, etc. Further, the trip duration 1010 may also influence the estimates, as LD events are more probable to occur after the driver has been driving for a long time.

The inward images may assist in detecting LD when the driver shows fatigue or inattentive behavior. The geography 1005 may also provide valuable information based on the location of the vehicle, as the norms for lanes may change from country to country. In various regions, such as the EU and the US, differences exist in the color schemes and lane departure markings. In Europe, white is predominantly used for lane markings, with yellow only appearing in construction zones to supersede the white lines. This practice aims to avoid disrupting the existing lanes by overlaying yellow markings. However, this approach can lead to confusion as vehicles may appear to be straddling a solid white line when, in fact, they are within the designated yellow boundaries.

During training 1014, the ML program, also referred to as ML algorithm or ML tool, analyzes the training data 1012 based on identified features 1002 and configuration parameters defined for the training. The result of the training 1014 is the ML model 1016, which is capable of taking inputs to produce assessments.

Training an ML algorithm involves analyzing large amounts of data (e.g., from several gigabytes to a terabyte or more) in order to find data correlations. The ML algorithms utilize the training data 1012 to find correlations among the identified features 1002 that affect the outcome or assessment 1020. In some examples, the training data 1012 includes labeled data, which is known data for one or more identified features 1002 and one or more outcomes, such as the calculation of the LD category and the confidence score. In some examples, the model outputs a value or category from the group comprising in-lane (when the vehicle is properly in the lane), dashed (when the vehicle is crossing a dashed line), yellow (when the vehicle is crossing a yellow line), and white (when the vehicle is crossing a white lane), and the confidence score associated with the selected value. However, other examples may include additional categories or fewer categories.

The ML algorithms usually explore many possible functions and parameters before finding what the ML algorithms identify to be the best correlations within the data; therefore, training may make use of large amounts of computing resources and time.

When the ML model 1016 is used to perform an assessment, new data 1018 is provided as input to the ML model 1016, and the ML model 1016 generates the assessment 1020 as output. For example, when analyzing the different inputs for a ten-second window (e.g., outward frames and vehicle speed), the ML model 1016 calculates the LD category (e.g., dashed for crossing a dashed lane).

In some examples, the input to the model may also include the value for the geography so the model may adjust to the rules for painting lanes in the corresponding country.

In some examples, results obtained by the model 1016 during operation (e.g., assessment 1020 produced by the model in response to inputs) are used to improve the training data 1012, which is then used to generate a newer version of the model. Thus, a feedback loop is formed to use the results obtained by the model to improve the model. In some examples, the ML program is one of a Residual Network (ResNet) model or a video transformer, but other examples may utilize other types of models.

Feature extraction is a process that reduces the amount of resources required to describe a large set of data. When performing analysis of complex data, one of the major problems stems from the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

The improvement in the quality of the ML model 1016 to estimate the occurrence of LD events will result in benefits for the service provider and the end customer. The service provider benefits because of the reduction in false positives with a more accurate model, and the fewer false positives, the less time has to be spent on reviewers to review the LD events. Similarly, the end customer will benefit when fewer LD events need to be reviewed by the reduction of false positives.

Further, in some examples, a minimum LD time threshold is configured, where lane departures lasting less than the threshold will not trigger LD events. Additionally, in some examples, a minimum time between LD events is set, such as lane departures, which will trigger separate LD events when the time between the departures is greater than the threshold.

In some examples, a minimum time threshold is set for the duration of the lane departure, and in-cab alerts will be triggered if the lane departure lasts longer than the minimum time threshold.

In some examples, the LD event will not be triggered if the turn signal is on, indicating that the vehicle is in the process of changing lanes.

Figure 11:
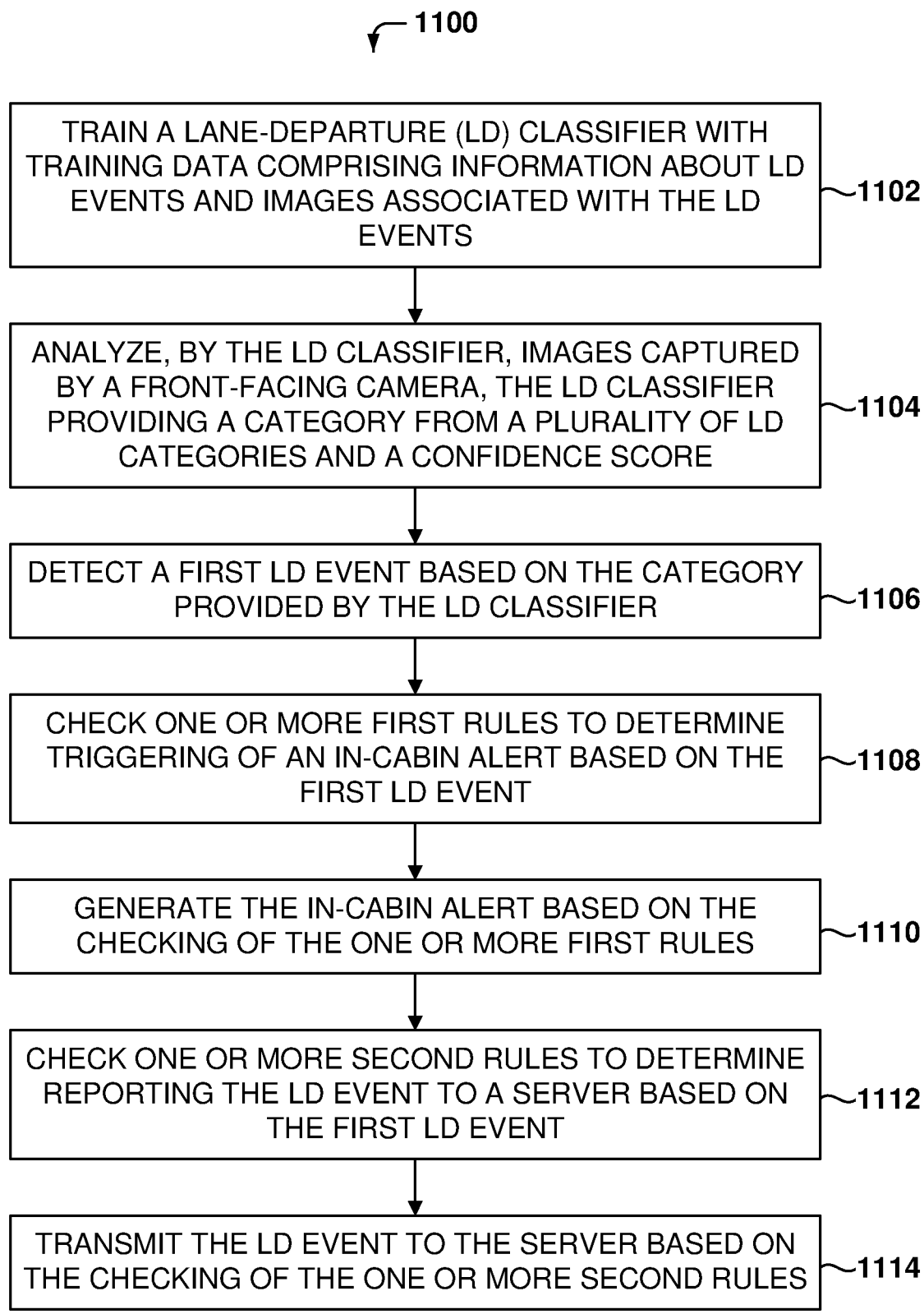
FIG. 11 is a flowchart of a method for the management of lane-departure events, according to some examples.

FIG. 11 is a flowchart of method 1100 for managing lane-departure events, according to some examples. While the various operations in this flowchart are presented and described sequentially, one of ordinary skill will appreciate that some or all of the operations may be executed in a different order, combined or omitted, or executed in parallel.

Operation 1102 is for training a lane-departure (LD) classifier with training data comprising information about LD events and images associated with the LD events.

From operation 1102, the method 1100 flows to operation 1104 for analyzing, by the LD classifier, images captured by a front-facing camera, the LD classifier providing a category from a plurality of LD categories, and a confidence score.

From operation 1104, the method 1100 flows to operation 1106 for detecting a first LD event based on the category provided by the LD model.

From operation 1106, the method 1100 flows to operation 1108 for checking one or more first rules to determine the triggering of an in-cabin alert based on the first LD event.

From operation 1108, the method 1100 flows to operation 1110 for generating the in-cabin alert based on the checking of the one or more first rules.

From operation 1110, the method 1100 flows to operation 1112 for checking one or more second rules to determine reporting the LD event to a server based on the first LD event.

From operation 1112, the method 1100 flows to operation 1114 for transmitting the LD event to the server based on the checking of the one or more second rules.

In some examples, the plurality of LD categories comprises in-lane when a vehicle is properly in the lane, dashed when the vehicle is crossing a dashed line, yellow when the vehicle is crossing a yellow line, and white when the vehicle is crossing a white lane.

In some examples, the confidence score is a numerical representation of the probability that the LD event occurred.

In some examples, features of the training data comprise outward images and geography.

In some examples, the method 1100 further comprises providing a user interface (UI) with options to configure parameters of the one or more first rules and the one or more second rules, where the options comprise turning on or off in-cab alerts, setting a minimum speed threshold for triggering LD events, and a detection sensitivity.

In some examples, the options further include an option for enabling nudges, which are in-cab alerts that inform a driver of LD events and when they will be escalated for reporting.

In some examples, the first rules include a rule for ignoring the LD event based on the confidence score being below a predetermined threshold.

In some examples, the first rules include a rule for ignoring the LD event based on the speed of a vehicle being below a predetermined threshold.

In some examples, the first rules include a rule for ignoring the LD event based on the LD event during less than a predetermined threshold amount of time.

In some examples, the method 1100 further comprises providing another UI to review LD events, the review including the presentation of a video from a front-facing camera with enhanced over-imposed lane markings.

In some examples, the second rules include a rule to check an occurrence of the LD event and a related driving-drowsy event.

In some examples, the second rules include a rule to check an occurrence of the LD event and a related inattentive-driving event.

In some examples, the second rules include a rule to check an occurrence of the LD event and a related lane-wandering event.

Another general aspect is for a system that includes a memory comprising instructions and one or more computer processors. The instructions, when executed by the one or more computer processors, cause the one or more computer processors to perform operations comprising: training a lane-departure (LD) classifier with training data comprising information about LD events and images associated with the LD events; analyzing, by the LD classifier, images captured by a front-facing camera, the LD classifier providing a category from a plurality of LD categories and a confidence score. detecting a first LD event based on the category provided by the LD model; checking one or more first rules to determine triggering of an in-cabin alert based on the first LD event; generating the in-cabin alert based on the checking of the one or more first rules; checking one or more second rules to determine reporting the LD event to a server based on the first LD event; and transmitting the LD event to the server based on the checking of the one or more second rules.

In yet another general aspect, a tangible machine-readable storage medium (e.g., a non-transitory storage medium) includes instructions that, when executed by a machine, cause the machine to perform operations comprising: training a lane-departure (LD) classifier with training data comprising information about LD events and images associated with the LD events; analyzing, by the LD classifier, images captured by a front-facing camera, the LD classifier providing a category from a plurality of LD categories and a confidence score. detecting a first LD event based on the category provided by the LD model; checking one or more first rules to determine triggering of an in-cabin alert based on the first LD event; generating the in-cabin alert based on the checking of the one or more first rules; checking one or more second rules to determine reporting the LD event to a server based on the first LD event; and transmitting the LD event to the server based on the checking of the one or more second rules.

Figure 12:
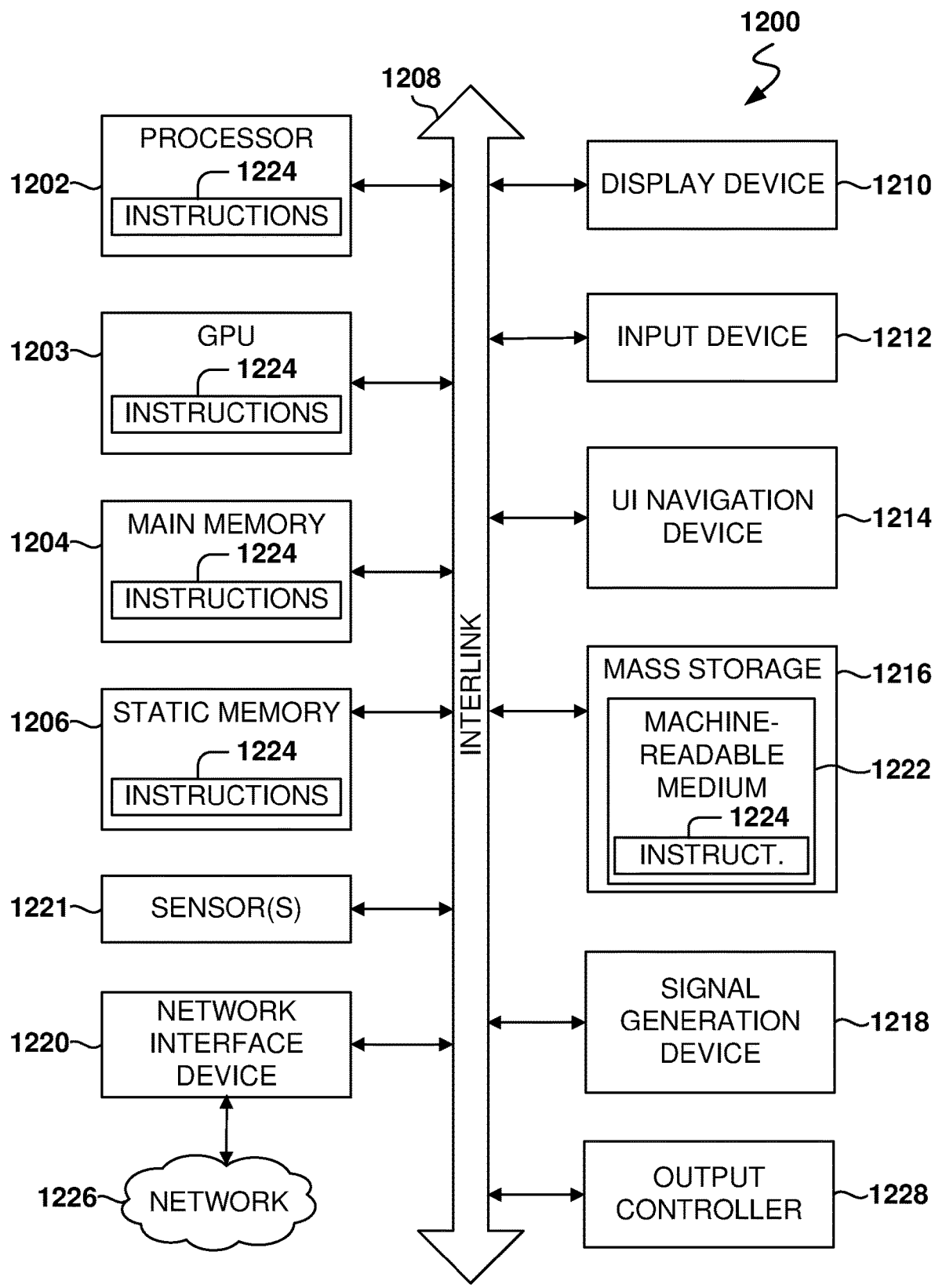
FIG. 12 is a block diagram illustrating an example of a machine upon or by which one or more example process examples described herein may be implemented or controlled.

FIG. 12 is a block diagram illustrating an example of a machine 1200 upon or by which one or more example process examples described herein may be implemented or controlled. In alternative examples, the machine 1200 may operate as a standalone device or be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1200 (e.g., computer system) may include a hardware processor 1202 (e.g., a central processing unit (CPU), a hardware processor core, or any combination thereof), a graphics processing unit (GPU 1203), a main memory 1204, and a static memory 1206, some or all of which may communicate with each other via an interlink 1208 (e.g., bus). The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device 1216 (e.g., drive unit), a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1202 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1202 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1202 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1202 may be emulated in software, running on a physical processor, as a virtual processor or virtual circuit. The virtual processor may behave like an independent processor but is implemented in software rather than hardware.

The mass storage device 1216 may include a machine-readable medium 1222 on which one or more sets of data structures or instructions 1224 (e.g., software) embodying or utilized by any of the techniques or functions described herein. The instructions 1224 may also reside, completely or at least partially, within the main memory 1204, within the static memory 1206, within the hardware processor 1202, or the GPU 1203 during execution thereof by the machine 1200. For example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium or multiple media (e.g., a centralized or distributed database and associated caches and servers) configured to store one or more instructions 1224.

The term "machine-readable medium" may include any medium that is capable of storing, encoding, or carrying instructions 1224 for execution by the machine 1200 and that causes the machine 1200 to perform any one or more of the techniques of the present disclosure or that is capable of storing, encoding, or carrying data structures used by or associated with such instructions 1224. Non-limiting machine-readable medium examples may include solid-state memories and optical and magnetic media. For example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be transmitted or received over a communications network 1226 using a transmission medium via the network interface device 1220.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
   training a lane-departure (LD) classifier with training data comprising information about LD events and images associated with the LD events;
   analyzing, by the LD classifier, images captured by a front-facing camera, the LD classifier providing a category from a plurality of LD categories and a confidence score;
   detecting a first LD event based on the category provided by the LD classifier;
   checking one or more first rules to determine triggering of an in-cabin alert based on the first LD event;
   generating the in-cabin alert based on the checking of the one or more first rules;
   checking one or more second rules to determine reporting the LD event to a server based on the first LD event; and
   transmitting the LD event to the server based on the checking of the one or more second rules.

2. The method as recited in claim 1, wherein the plurality of LD categories comprises in-lane when a vehicle is properly in a lane, dashed when the vehicle is crossing a dashed line, yellow when the vehicle is crossing a yellow line, and white when the vehicle is crossing a white lane.

3. The method as recited in claim 1, wherein the confidence score is a numerical representation of a probability that the LD event occurred.

4. The method as recited in claim 1, wherein features of the training data comprise outward images and geography.

5. The method as recited in claim 1, further comprising:
   providing a user interface (UI) with options to configure parameters of the one or more first rules and the one or more second rules, wherein the options comprise turning on or off in-cab alerts, setting a minimum speed threshold for triggering LD events, and setting a detection sensitivity.

6. The method as recited in claim 5, wherein the options further include an option for enabling nudges which are in-cab alerts to inform a driver of the LD events and when the LD events will be escalated for reporting.

7. The method as recited in claim 1, wherein the first rules include a rule for ignoring the LD event based on the confidence score being below a predetermined threshold.

8. The method as recited in claim 1, wherein the first rules include a rule for ignoring the LD event based on a speed of a vehicle being below a predetermined threshold.

9. The method as recited in claim 1, wherein the first rules include a rule for ignoring the LD event based on the LD event during less than a predetermined threshold amount of time.

10. The method as recited in claim 1, further comprising:
providing another user interface (UI) to review LD events, the review including presentation of a video from a front-facing camera with enhanced over imposed lane markings.

11. The method as recited in claim 1, wherein the second rules include a rule to check an occurrence of the LD event and a related driving-drowsy event.

12. The method as recited in claim 1, wherein the second rules include a rule to check an occurrence of the LD event and a related inattentive-driving event.

13. The method as recited in claim 1, wherein the second rules include a rule to check an occurrence of the LD event and a related lane-wandering event.

14. A system comprising:
a memory comprising instructions; and
one or more computer processors, wherein the instructions, when executed by the one or more computer processors, cause the system to perform operations comprising:
training a lane-departure (LD) classifier with training data comprising information about LD events and images associated with the LD events;
analyzing, by the LD classifier, images captured by a front-facing camera, the LD classifier providing a category from a plurality of LD categories and a confidence score;
detecting a first LD event based on the category provided by the LD classifier;
checking one or more first rules to determine triggering of an in-cabin alert based on the first LD event;
generating the in-cabin alert based on the checking of the one or more first rules;
checking one or more second rules to determine reporting the LD event to a server based on the first LD event; and
transmitting the LD event to the server based on the checking of the one or more second rules.

15. The system as recited in claim 14, wherein the plurality of LD categories comprises in-lane when a vehicle is properly in a lane, dashed when the vehicle is crossing a dashed line, yellow when the vehicle is crossing a yellow line, and white when the vehicle is crossing a white lane.

16. The system as recited in claim 14, wherein the confidence score is a numerical representation of a probability that the LD event occurred.

17. The system as recited in claim 14, wherein features of the training data comprise outward images and geography.

18. The system as recited in claim 14, wherein the instructions further cause the one or more computer processors to perform operations comprising:
providing a user interface (UI) with options to configure parameters of the one or more first rules and the one or more second rules, wherein the options comprise turning on or off in-cab alerts, setting a minimum speed threshold for triggering LD events, and setting a detection sensitivity.

19. A non-transitory machine-readable storage medium including instructions that, when executed by a machine, cause the machine to perform operations comprising:
training a lane-departure (LD) classifier with training data comprising information about LD events and images associated with the LD events;
analyzing, by the LD classifier, images captured by a front-facing camera, the LD classifier providing a category from a plurality of LD categories and a confidence score;
detecting a first LD event based on the category provided by the LD classifier;
checking one or more first rules to determine triggering of an in-cabin alert based on the first LD event;
generating the in-cabin alert based on the checking of the one or more first rules;
checking one or more second rules to determine reporting the LD event to a server based on the first LD event; and
transmitting the LD event to the server based on the checking of the one or more second rules.

20. The non-transitory machine-readable storage medium as recited in claim 19, wherein the plurality of LD categories comprises in-lane when a vehicle is properly in a lane, dashed when the vehicle is crossing a dashed line, yellow when the vehicle is crossing a yellow line, and white when the vehicle is crossing a white lane.

* * * * *

UNITED STATES PATENT AND TRADEMARK OFFICE
CERTIFICATE OF CORRECTION

| | | |
|---|---|---|
| PATENT NO. | : 12,165,393 B1 | Page 1 of 1 |
| APPLICATION NO. | : 18/643164 | |
| DATED | : December 10, 2024 | |
| INVENTOR(S) | : Dhamija et al. | |

It is certified that error appears in the above-identified patent and that said Letters Patent is hereby corrected as shown below:

On the Title Page

In item (72), in "Inventors", in Column 1, Line 2, delete "Abner Ayala" and insert -- Abner Ayala Acevedo -- therefor In item (72), in "Inventors", in Column 1, Line 9, delete "Nathan Hurst" and insert -- William Nathan Hurst -- therefor Signed and Sealed this
Twenty-third Day of December, 2025

John A. Squires
*Director of the United States Patent and Trademark Office*